Dec. 6, 1949     R. G. PICARD     2,490,468
VACUUM GAUGE STRUCTURE
Filed Oct. 19, 1946
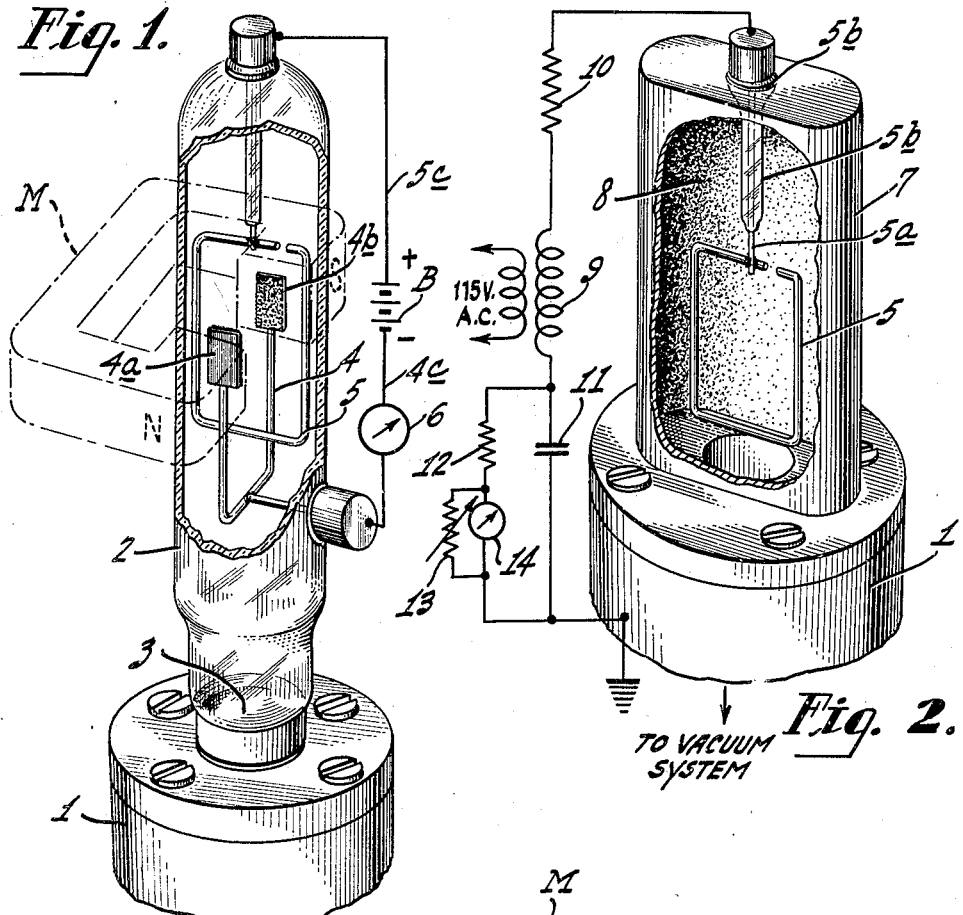
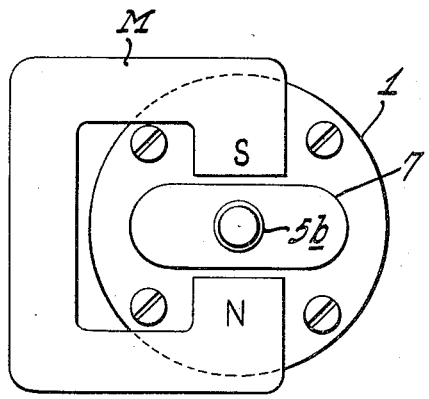
Inventor
Robert G. Picard
By
C. D. Luska
Attorney Patented Dec. 6, 1949

2,490,468

UNITED STATES PATENT OFFICE 2,490,468

VACUUM GAUGE STRUCTURE

Robert G. Picard, Collingswood, N. J., assignor to Radio Corporation of America, a corporation of Delaware Application October 19, 1946, Serial No. 704,379

1 Claim. (Cl. 250—27.5)

This invention relates to the art of ascertaining the pressure of a gas, for example, air in a vacuum-plumbing system, and has special reference to the provision of improvements in vacuum gauges of the type wherein the electrical intensity of a glow discharge in the gas provides the desired pressure indication.

It is well known (see Schafer 1,377,282) that the intensity of the electromotive force required to establish and maintain a glow discharge in a gas is a function of the pressure of the gas. It is also known (see Penning 2,197,079) that the sensitivity of a vacuum gauge constructed in accordance with the foregoing principle may be increased by subjecting the electrons (which are responsible for maintaining the glow discharge) to a magnetic field whereby the said electrons are caused to traverse a long spiral path in the gas (as in Gerdien 1,004,012) and thereby augment the probability of the electrons striking and "igniting" the discrete molecules of which the rarefied gas is composed. Such magnetically-sensitized vacuum gauges are commonly known in the art as "Philips' gauges."

It is an object of the present invention to provide an improved Philips' gauge.

Another object of the present invention is to provide a glow-discharge vacuum gauge of a sensitivity greater than that of present day vacuum gauges of the same general type and one wherein the increase in sensitivity is achieved without any noticeable complication in the form, size or structure of either the gauge or its associated indicating mechanism.

Another and important object of the present invention is to provide a glow-discharge vacuum gauge of a sensitivity comparable to that of thermionic gas-gauges and one which, unlike the latter type, may be employed in the vacuum plumbing system of an electron microscope or other device wherein the chamber to be evacuated may contain air or other gas at atmospheric pressure.

The foregoing and other objects are achieved in accordance with the invention by the provision of a glow-discharge vacuum gauge wherein the very small number of "free electrons" (which are forced away from a normal atom of gas when a difference of electric potential exists upon two electrodes spaced at a predetermined distance) is augmented by electrons from a non-thermionic source of secondary electrons whereby the probability of a collision between the electrons and the gas atoms is enhanced by the sheer number of available electrons.

In the drawing: Fig. 1 is a partly diagrammatic view of a vacuum-plumbing system including a magnetically controlled D. C. operated, Philips' gauge sensitized in accordance with the present invention, Fig. 2 is a similar view of an alternative all-metal form of gauge, with the magnet removed, and Fig. 3 is a top plan view of the gauge of Fig. 2 with the magnet in position.

In the embodiment of the invention shown in Fig. 1, I designates generally an evacuable chamber such, for example, as the specimen chamber of an electron microscope, and 2 designates the glass bulb of a vacuum gauge which is in flow communication with the chamber I through an open port 3. As in a conventional Philips' gauge the bulb 2 contains a bi-part cathode comprising a pair of parallelly arranged nickel or equivalent metal plates 4a, 4b, which are mounted upon the upstanding arms of a U-shape support 4, and a ring-like wire anode 5 which extends well beyond the boundaries of the cathode plate 4a, 4b in an intermediate plane normal to the plane of the U. As indicated by the stippling in the drawing the facing surfaces of the cathode plates 4a and 4b and preferably the inner surface of the bulb around the said plates are coated, in accordance with the present invention, with caesium or equivalent secondary-electron-emissive material. A magnet M is mounted, as in standard practice, on the outside of the bulb 2, with its poles N and S in register with the cathode plates 4a and 4b and out of register with the anode 5. In the instant case, a direct current source (say 2000–3000 volts), exemplified by the battery B, supplies energizing current to the electrodes of the gauge through suitable leads 4c and 5c. A milliammeter 6 connected between the negative pole of the battery B and the cathode lead 4c provides a continuous indication of the ionizing current while the chamber I is "on the pump." If desired the scale of the meter 6 may be calibrated with pressure indicia.

In the device of Fig. 1, as in a conventional Philips' gauge, the negatively charged "free" electrons and the positively charged "free" ions (which are released from a normal atom of gas by the difference in potential between the cathode and anode) are directed by the magnet M through several excursions in a helical path between the two cathode plates before they impinge upon the positive or negative electrodes to which they are respectively drawn by the electric field. Obviously, when the effective length of the paths of these differently charged electrical particles is increased by the presence of the magnetic field, the probability of a given particle striking a gas atom and thus intensifying the glow discharge (by releasing additional electrons from the gas) is greatly enhanced.

While, as above indicated, the device of Fig. 1 utilizes the "long-path effect" of the magnetic field upon both the positive and the negatively charged particles in the gas, the present invention is concerned not so much with the effect of the magnetic field as it is with the effect of the electric (as distinguished from magnetic) field upon the positive ions. Here the effect of the direct-current electric field, existing between the cathode and the anode, is to direct the said positively charged particles to one or another of the added electron-emissive surfaces with enough force to release secondary-electrons in numbers sufficient to increase greatly the probabilities of a collision between the electrons and the ever decreasing numbers of available gas atoms.

In the all-metal vacuum gauge of Fig. 2 the envelope 7 of the gauge comprises the cathode and, like the cathode of the gauge of Fig. 1, is coated with caesium or equivalent secondary-electron-emissive substance 8. It will be observed that the metal envelope 7 is in the form of a flattened ellipse and that the poles N and S of the magnet M (Fig. 3) are presented to the flat parallel sides so that the magnetic flux traverses a short path through the envelope. The ring-like anode 5 which surrounds but does not touch the path of the magnetic flux is supported within the envelope 7 upon a lead 5a which is insulated from the metal walls by a glass sleeve 5b. As here set-up the gauge is actuated by alternating current from a 115 volt source which includes a transformer secondary 9 which produces a potential of the order of, say 2000–3000 volts.

One terminal of the secondary winding 9 is connected to the ring electrode 5 through a resistor 10 (say, 750,000 ohms) and the other terminal is connected to the grounded metal casings 1 and 7 through a capacitor 11 (say 1 mfd.). A shunt circuit about the capacitor 11 includes a series resistor 12 (100,000 ohms) and a variable shunting resistor 13 about a D. C. milliammeter 14. When thus energized the "free" electrons released from the gas tend to travel along curved paths under the influence of the magnet M to the ring 5, and the positively charged ions toward the cathode, during one half of the A. C. cycle and in the opposite direction during the other half cycle. Thus, during one-half cycle the secondary electron-emissive coating 8 on the inner surface of the metal shell 7 is subjected to bombardment by ions and during the next half cycle to bombardment by electrons. This emissive coating thus continuously augments the supply of electrons available for bombarding the gas and maintaining and intensifying the glow discharge.

It will now be apparent that the present invention provides a glow-discharge vacuum gauge of a sensitivity greater than that of present day vacuum gauges of the same general type and one wherein the increase in sensitivity is achieved in a simple and facile manner.

What is claimed is:

In a device for measuring the pressure of a gas from the current intensity of a glow discharge taking place in the gas, a cathodal metal envelope having a cross section of a long diameter and a short diameter and provided with an opening for the passage of the gas, a magnet having pole faces presented to the exterior of said envelope in register with said short diameter for applying magnetic lines of force along a short path through said envelope, and an anode mounted within said envelope adjacent to the short path traversed by said magnetic lines of force.

ROBERT G. PICARD.

REFERENCES CITED

The following references are of record in the file of this patent:

UNITED STATES PATENTS

| Number | Name | Date |
|---|---|---|
| 2,081,429 | Gaede | May 25, 1937 |
| 2,139,813 | Farnsworth | Dec. 13, 1938 |
| 2,171,145 | Leverenz | Aug. 29, 1939 |
| 2,197,079 | Penning | Apr. 16, 1940 |
| 2,263,032 | Farnsworth | Nov. 18, 1941 |